(12) United States Patent  (10) Patent No.: US 8,768,589 B2
Arai                                (45) Date of Patent:     Jul. 1, 2014

(54) CONTROL DEVICE FOR DUAL CLUTCH TRANSMISSION AND CONTROL METHOD FOR DUAL CLUTCH TRANSMISSION

(75) Inventor: Katsuhiro Arai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/994,221

(22) PCT Filed: Dec. 5, 2011

(86) PCT No.: PCT/JP2011/006792
    § 371 (c)(1),
    (2), (4) Date: Jun. 14, 2013

(87) PCT Pub. No.: WO2012/081190
    PCT Pub. Date: Jun. 21, 2012

(65) Prior Publication Data
    US 2013/0261912 A1    Oct. 3, 2013

(30) Foreign Application Priority Data
    Dec. 15, 2010  (JP) ................. 2010-279432

(51) Int. Cl.
    *F16H 61/688*  (2006.01)
(52) U.S. Cl.
    USPC .................. 701/67; 701/62; 701/64
(58) Field of Classification Search
    None
    See application file for complete search history.

(56) References Cited

U.S. PATENT DOCUMENTS

| 7,228,216 B2 * | 6/2007 | Inoue ............................. 701/67 |
| 2004/0166990 A1 | 8/2004 | Buchanan et al. |
| 2004/0166991 A1 | 8/2004 | Buchanan et al. |
| 2004/0172184 A1 | 9/2004 | Vukovich et al. |
| 2004/0204288 A1 * | 10/2004 | Katakura ........................ 477/80 |
| 2008/0026910 A1 * | 1/2008 | Honma et al. ................ 477/149 |
| 2009/0078072 A1 | 3/2009 | Tsukada et al. |
| 2009/0143949 A1 * | 6/2009 | Fukaya et al. .................. 701/67 |
| 2010/0042302 A1 * | 2/2010 | Fritzer et al. ................... 701/62 |

FOREIGN PATENT DOCUMENTS

| JP | 02-283532 A | 11/1990 |
| JP | 2004-251456 A | 9/2004 |
| JP | 2004-308841 A | 11/2004 |
| JP | 2007-154941 A | 6/2007 |
| JP | 2007-154941 A * | 6/2007 ............ F16H 61/12 |
| JP | 2008-032184 A | 2/2008 |
| JP | 2008-032185 A | 2/2008 |
| JP | 2008-190608 A | 8/2008 |
| JP | 2009-079701 A | 4/2009 |

OTHER PUBLICATIONS

Official Communication issued in International Patent Application No. PCT/JP2011/006792, mailed on Mar. 6, 2012.

* cited by examiner

*Primary Examiner* — John R Olszewski
*Assistant Examiner* — Jess Whittington
(74) *Attorney, Agent, or Firm* — Keating & Bennett, LLP (57) ABSTRACT

A dual clutch transmission includes a transmission control unit that controls action of a first clutch actuator, a second clutch actuator, and a shift mechanism; determines whether or not a clutch torque capacity for an engaging-side clutch has increased to a determination value during a clutch change period; and, if the clutch torque capacity for the engaging-side clutch has increased to the determination value, changes the torque transmission path by reducing the clutch torque capacity of a release-side clutch.

8 Claims, 7 Drawing Sheets

CONTROL DEVICE FOR DUAL CLUTCH TRANSMISSION AND CONTROL METHOD FOR DUAL CLUTCH TRANSMISSION

BACKGROUND OF THE INVENTION

1. Field of the Invention

The present invention relates to a control apparatus for a dual clutch transmission, i.e., a transmission including a plurality of clutches, and to a control method for the dual clutch transmission.

2. Description of the Related Art

A conventional dual clutch transmission, which is mounted on a motor vehicle and includes a plurality of clutches for fast gear changes of the motor vehicle, (referred to simply as "transmission" below in some case) and a control apparatus to control the dual clutch transmission are known (see, for example, Japanese Patent Application Laid-Open No. 2004-251456 and Japanese Patent Application Laid-Open No. 2004-308841).

The transmission includes a plurality of clutches disposed between an engine and input shafts of two systems, each clutch being capable of transmitting a driving force or blocking the transmission of the driving force, and pairs of gears divided into the two systems (e.g., two systems of an odd transmission stage group and an even transmission stage group) that selectively connect the input shafts of the two systems and a transmission output shaft (hereinafter referred to simply as "output shaft") according to a shifter selection.

In this transmission, while power is being transmitted to one of the pairs of gears in one transmission stage group that is connected to one of the clutches by engaging the one clutch and is selected by the shifter, the pairs of gears in the other transmission stage group corresponding to the other clutch can be kept in a neutral state, where no power is transmitted, by selecting through the shifter while the other clutch is held in engagement. That is, in a state where the two clutches are engaged, power can be transmitted from the output shaft to a drive wheel through the desired pair of gears in the transmission stage selected by the shifter.

Also, at the time of changing gears, the other clutch of the plurality of clutches associated with the transmission system of the transmission stage group not transmitting power is released. One of the pairs of gears in the transmission system including the input shaft connected to the other clutch is then selected and shifted into the target transmission stage. The other clutch is thereafter engaged while the one clutch that has been transmitting power is released.

That is, in the conventional dual clutch transmission, when a transmission stage is shifted from a selected and operational transmission stage (also referred to as "previous stage") to a target transmission stage (also referred to as "next stage"), a control apparatus performs interchanging of the clutches by simultaneously operating the clutches, i.e., by releasing the clutch that is transmitting power and by engaging the clutch that is to transmit power through the following transmission stage (next stage) in a state where the pairs of gears in the two transmission systems are connected.

As described in Japanese Patent Application Laid-Open No. 2004-251456 and Japanese Patent Application Laid-Open No. 2004-308841, when controlling the conventional dual clutch transmission in which interchange between the plurality of clutches is performed while the clutches are being operated simultaneously, it is necessary to keep the sum of the torque capacities of the clutches simultaneously operated equal to a target value such as a value of the engine torque on a clutch portion from beginning to end of the clutch interchange in order to avoid shift shocks (including a change in vehicle speed, and pitching) caused by the interchange as effectively as possible.

In the following description, a clutch that is being used and that is to be interchanged is referred to as a "release-side clutch", and a clutch that transmits a torque in engagement after gear change is referred to as an "engaging-side clutch".

According to the transmission control of a conventional dual clutch transmission that is mounted on a motor vehicle or the like, in a torque transmission path change phase, clutch interchange is performed by simultaneously operating a plurality of clutches including both a release-side clutch and an engaging-side clutch.

When performing clutch interchange control that is used in a motorcycle, if a malfunction occurs in the engaging-side clutch, in the case of a power-on upshift state, since both clutches are disconnected, the engine rotational speed increases excessively and a shift shock is caused.

In this case, the following situation is assumed with respect to a malfunction of the engaging-side clutch. In the clutches, there is a possibility of occurrence of immobility such that the clutch does not move from the current state. Immobility is sometimes called "clutch sticking" (referred to as "sticking" below). The term sticking refers to immobility from the current state rather than adherence of a clutch. For example, the state of the clutch does not change from a state of being held out of engagement, the clutch remains out of engagement, and from a state of being held in engagement, the clutch remains engaged. Although there is a possibility of the sticking occurring in each of the release-side clutch and the engaging-side clutch, a problem arises in the clutch interchange control when the sticking occurs in the engaging-side clutch. That is, in the torque transmission path change phase, when in a power-on upshift state, if the engaging-side clutch does not engage, since the load is disconnected, the engine rotational speed increases excessively. Since the torque is disconnected, an attempt is then made to engage the clutch, and inertial torque is produced and a shift shock is caused. If sticking occurs in the release-side clutch, double engagement is caused by the BTL (back torque limiter), so that braking is effected and a particularly large clutch malfunction does not occur.

A malfunction (sticking) in the engaging-side clutch is difficult to predict until clutch interchange is actually performed. Furthermore, since a certain time period (for example, 50 ms) is required to determine the sticking, the occurrence of an excessive increase in the engine rotational speed cannot be suppressed or prevented. Note that an excessive increase in the engine rotational speed due to sticking that occurs in the engaging-side clutch in this manner is not liable to occur in a motor vehicle because the rotating mass of an engine thereof is greater than in a motorcycle and the weight is also greater than in a motorcycle.

SUMMARY OF THE INVENTION

Preferred embodiments of the present invention provide a control apparatus for a dual clutch transmission and a control method for the dual clutch transmission that significantly reduces or prevents a malfunction behavior of a clutch in a vehicle or the like including the dual clutch transmission when the clutch malfunctions.

According to a preferred embodiment of the present invention, a control apparatus for a dual clutch transmission includes a first main shaft including odd-numbered transmission gears, a first clutch that transmits an engine torque to the first main shaft or blocks a transmission of the engine torque to the first main shaft, a second main shaft including even-numbered transmission gears, a second clutch that transmits the engine torque to the second main shaft or blocks the transmission of the engine torque to the second main shaft, an output shaft including driven gears arranged to mesh with the odd-numbered transmission gears and the even-numbered transmission gears, rotation from the first main shaft or the second main shaft being transmitted through the output shaft to a drive wheel, and a transmission control unit programmed to control the first clutch and the second clutch in a clutch interchange period to change a path of transmission of the torque so that a shift from a previous stage to a next stage in transmission stages is made, in which the transmission control unit is programmed to determine whether or not a clutch torque capacity of one of the first clutch and the second clutch in a next stage increases to a predetermined determination value in the clutch interchange period, and if the clutch torque capacity of the one clutch in the next stage increases to the determination value, changes the path of transmission of the torque by reducing a clutch torque capacity of the other of the first clutch and the second clutch in a previous stage.

Another preferred embodiment of the present invention provides a control method for a dual clutch transmission that includes a first main shaft including odd-numbered transmission gears, a first clutch that transmits an engine torque to the first main shaft or blocks a transmission of the engine torque to the first main shaft, a second main shaft including even-numbered transmission gears, a second clutch that transmits the engine torque to the second main shaft or blocks the transmission of the engine torque to the second main shaft, and an output shaft including driven gears arranged to mesh with the odd-numbered transmission gears and the even-numbered transmission gears, rotation from the first main shaft or the second main shaft being transmitted through the output shaft to a drive wheel, the method including controlling the first clutch and the second clutch in a clutch interchange period to change a path of transmission of the torque so that a shift from a previous stage to a next stage in transmission stages is made, and determining whether or not a clutch torque capacity of one of the first clutch and the second clutch in a next stage increases to a predetermined determination value in the clutch interchange period, and if the clutch torque capacity of the one clutch in the next stage increases to the determination value, changing the path of transmission of the torque by reducing a clutch torque capacity of the other of the first clutch and second clutch in a previous stage.

According to preferred embodiments of the present invention, when a clutch malfunctions in a vehicle or the like including the dual clutch transmission, a malfunction behavior of the clutch can be significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the drawings.

A control apparatus for a dual clutch transmission according to the present preferred embodiment is arranged to change transmission stages by controlling the dual clutch transmission including a plurality of clutches. The present preferred embodiment will be described by assuming that a vehicle on which the control apparatus and the dual clutch transmission controlled by the control apparatus are mounted is a motorcycle. However, the present preferred embodiment is not limited to this. The control apparatus and the dual clutch transmission controlled by the control apparatus may be mounted on a four-wheel motor vehicle, a three-wheel motor vehicle or the like. Also, the dual clutch transmission may be a semiautomatic transmission such that a clutch operation at the start of travel and determination of shift change timing are left to a driver and the remaining portion of the control is automated, or may be a fully automatic transmission.

Figure 1:
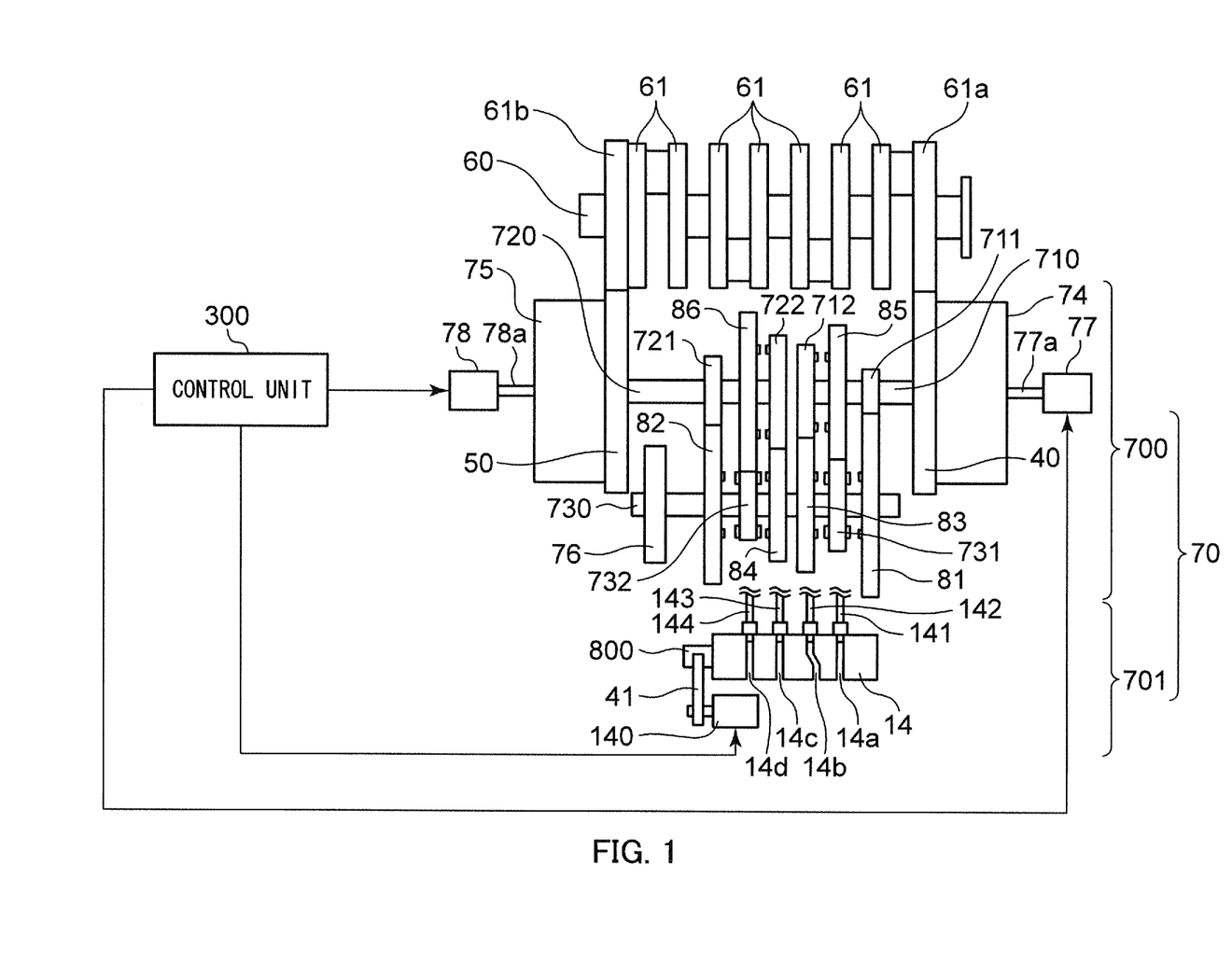
FIG. 1 is a schematic diagram showing the construction of a portion of a dual clutch transmission controlled by a control apparatus for the dual clutch transmission according to a preferred embodiment of the present invention.

The dual clutch transmission controlled by the control apparatus for the dual clutch transmission according to the present preferred embodiment will be outlined with reference to FIG. 1.

FIG. 1 is a schematic diagram showing the construction of a portion of a dual clutch transmission 70 controlled by the control apparatus for the dual clutch transmission according to a preferred embodiment of the present invention.

Dual clutch transmission (hereinafter referred to as "transmission") 70 shown in FIG. 1 is a dual clutch transmission (DCT), in which a plurality of clutches (first clutch 74 and second clutch 75) are alternately interchanged to enable transmission of driving force to a transmission gear in an odd stage or in an even stage.

As shown in FIG. 1, transmission 70 includes transmission mechanism 700 that is connected to crankshaft 60 of an engine and that transmits a torque transmitted from crankshaft 60 to a rear wheel (not illustrated) while changing the torque, and shift mechanism 701 that performs a change operation in transmission mechanism 700. Crankshaft 60 is disposed perpendicularly or substantially perpendicularly to the front-rear direction of the vehicle and substantially horizontally (in a lateral direction) in the motorcycle.

Crankshaft 60 includes a plurality of crank webs 61. Crank webs 61a and 61b in the plurality of crank webs, which are respectively disposed on one end and the other end of crankshaft 60, are each an external gear including gear grooves provided on its outer circumferential surface.

Crank web 61a meshes with first primary driven gear (also referred to as "first input gear") 40 in first clutch 74. Power transmitted from crank web 61a on the one end of crankshaft 60 to first input gear 40 by this meshing is transmitted from the one end of crankshaft 60 to first main shaft 710 of transmission through first clutch 74.

Crank web 61b meshes with second primary driven gear (also referred to as "second input gear") 50 in second clutch 75. Power transmitted from crank web 61b on the other end of crankshaft 60 to second input gear 50 by this meshing is transmitted from the other end of crankshaft 60 to second main shaft 720.

Transmission mechanism 700 includes first main shaft 710, second main shaft 720, and drive shaft (output shaft) 730 disposed parallel or substantially parallel to crankshaft 60, first clutch 74, second clutch 75, gears 81 to 86, 711, 712, 721, 722, 731, and 732 through which power is transmitted between shafts 710 to 730, drive sprocket (hereinafter referred to simply as "sprocket") 76, and first and second clutch actuators 77 and 78.

In transmission mechanism 700, power transmitted to first and second main shafts 710 and 720 is transmitted to drive shaft 730 disposed at a rear position in the vehicle through gears selected as desired from gears 81 to 86, 711, 712, 721, 722, 731, and 732 constituting the transmission stages. Sprocket 76 is fixed on one end (left end) of drive shaft 730. A drive chain wound around a gear provided on a rotating shaft of the rear wheel (not illustrated) is wound around sprocket 76. As sprocket 76 rotates with the rotation of drive shaft 730, a driving force from transmission 70 is transmitted to the rear wheel, which is a drive wheel, through the drive chain (not illustrated). In other words, a torque produced in the engine is outputted from drive shaft 730 via first clutch 74 or second clutch 75 and one of the predetermined gear trains corresponding to the transmission stages to rotate the rear wheel (drive wheel).

A power transmitting portion of first main shaft 710 through which the driving force is outputted to drive shaft 730 through gears in an odd stage (in gears 81, 83, 85, 711, 712, and 731) and a power transmitting portion of second main shaft 720 through which the driving force is outputted to drive shaft 730 through gears in an even stage (in gears 82, 84, 86, 721, 722, and 732) have outer diameters equal or substantially equal to each other. The power transmitting portion of first main shaft 710 and the power transmitting portion of second main shaft 720 are disposed on concentric circles without interfering with each other. In transmission mechanism 700, first main shaft 710 and second main shaft 720 having outer diameters equal or substantially equal to each other are disposed side by side in left and right positions on one axial line and are rotated independently of each other.

First main shaft 710 is connected to first clutch 74, while second main shaft 720 is connected to second clutch 75.

On first main shaft 710, transmission gears 711, 85 and 712 constituting the odd stages are disposed. More specifically, fixed gear (first-capable gear) 711, fifth gear 85 and spline gear (third-capable gear) 712 are disposed on first main shaft 710 in order from the base end to which first clutch 74 is connected.

Fixed gear 711 is integral with first main shaft 710 and rotates together with first main shaft 710. Fixed gear 711 meshes with first gear (driven-side gear) 81 on drive shaft 730. Fixed gear 711 is also referred to as "first-capable gear" in this description.

Fifth gear 85 is mounted on first main shaft 710 in a position between first-capable fixed gear 711 and third-capable spline gear 712 at certain distances from these gears so as to be rotatable about the axis of first main shaft 710 while being prevented from moving in the axial direction.

Fifth gear 85 meshes with spline gear (fifth-capable gear as a driven-side gear) 731 on drive shaft 730.

Spline gear 712 is mounted on first main shaft 710 at the fore end side, i.e., at the end remote from first clutch 74, so as to be rotatable with the rotation of first main shaft 710 and slidable along the axial direction.

More specifically, spline gear 712 is mounted on first main shaft 710 so as to be slidable along the axial direction while being prevented from rotating relative to first main shaft 710 by splines provided along the axial direction on the outer periphery of a fore end of first main shaft 710. Spline gear 712 meshes with third gear (driven-side gear) 83 on drive shaft 730. Spline gear 712 is connected to shift fork 142 and is moved on first main shaft 710 along the axial direction by the movement of shift fork 142. Spline gear 712 is also referred to as "third-capable gear" in this description.

Spline gear 712 is moved toward fifth gear 85 on first main shaft 710 to be brought into engagement with fifth gear 85 thus stopping fifth gear 85 from rotating (racing) about the axis on first main shaft 710. By engaging spline gear 712 with fifth gear 85, fifth gear 85 is fixed on first main shaft 710 to be able to rotate integrally with the rotation of first main shaft 710.

On the other hand, on second main shaft 720, transmission gears 721, 86 and 722 constituting the even stages are disposed. More specifically, fixed gear (second-capable gear) 721, sixth gear 86 and spline gear (fourth-capable gear) 722 are disposed on second main shaft 720 in order from the base end to which second clutch 75 is connected.

Fixed gear 721 is integral with second main shaft 720 and rotates together with second main shaft 720. Fixed gear 721 meshes with second gear (driven-side gear) 82 on drive shaft 730. Fixed gear 721 is also referred to as "second-capable gear" in this description.

Sixth gear 86 is mounted on second main shaft 720 in a position between second-capable fixed gear 721 and spline gear 722, which is a fourth-capable gear, at certain distances from these gears so as to be rotatable about the axis of second main shaft 720 while being prevented from moving in the axial direction. Sixth gear 86 meshes with spline gear 732 (sixth-capable gear as a driven-side gear) on drive shaft 730.

Spline gear (also referred to as "fourth-capable gear") 722 is mounted on second main shaft 720 at the fore end side, i.e., at the end remote from second clutch 75, so as to be rotatable with the rotation of second main shaft 720 and slidable along the axial direction.

More specifically, spline gear 722 is mounted on second main shaft 720 so as to be slidable along the axial direction while being prevented from rotating relative to second main shaft 720 by splines provided along the axial direction on the outer periphery of a fore end of second main shaft 720. Spline gear 722 meshes with fourth gear (driven-side gear) 84 on drive shaft 730. Spline gear 722 is connected to shift fork 143 and is moved on second main shaft 720 along the axial direction by the movement of shift fork 143.

Spline gear 722 is moved toward sixth gear 86 on second main shaft 720 to be brought into engagement with sixth gear 86 thus preventing sixth gear 86 from rotating (racing) about the axis on second main shaft 720. By engaging spline gear 722 with sixth gear 86, sixth gear 86 is fixed on second main shaft 720 to be able to rotate integrally with the rotation of second main shaft 720.

On the other hand, on drive shaft 730, first gear 81, spline gear (fifth-capable gear) 731, third gear 83, fourth gear 84, spline gear (sixth-capable gear) 732, second gear 82 and sprocket 76 are disposed in order from the side of first clutch 74.

On drive shaft 730, first gear 81, third gear 83, fourth gear 84 and second gear 82 are arranged so as to be rotatable about drive shaft 730 while being prohibited from moving along the axial direction of drive shaft 730.

Spline gear (also referred to as "fifth-capable gear") 731 is mounted on drive shaft 730 so as to be slidable along the axial direction while being prevented from rotating relative to drive shaft 730 by spline engagement. That is, spline gear 731 is mounted so as to be movable relative to drive shaft 730 in a thrust direction and rotatable with drive shaft 730. Spline gear 731 is connected to shift fork 141 of shift mechanism 701. With a movement of shift fork 141, spline gear 731 is moved on drive shaft 730 along the axial direction.

Spline gear (also referred to as "sixth-capable gear") 732 is mounted on drive shaft 730 so as to be slidable along the axial direction while being prevented from rotating relative to drive shaft 730 by spline engagement. That is, spline gear 732 (sixth-capable gear) is mounted so as to be movable relative to drive shaft 730 in a thrust direction and rotatable with drive shaft 730. Spline gear 732 is connected to shift fork 144 of shift mechanism 701. With a movement of shift fork 144, spline gear 732 is moved on drive shaft 730 along the axial direction.

Sprocket 76 is fixed on an end of drive shaft 730 positioned at the side of second clutch 75.

Spline gears 712, 722, 731, and 732 function as transmission gears and also function as dog selectors. More specifically, projections and recesses fitting each other are provided on surfaces facing each other of spline gears 712, 722, 731, and 732 and the transmission gears adjacent to spline gears 712, 722, 731, and 732 in the axial direction. By fitting the projections and recesses to each other, each pair of gears rotates integrally.

Thus, spline gears 712, 722, 731, and 732 are moved in the axial direction by connected shift forks 141 to 144 so that each spline gear is connected to the transmission gear (in first gear 81 to sixth gear 86) adjacent to the spline gear in the axial direction by the dog mechanism.

First clutch 74 and second clutch 75 are spaced apart from each other in a direction (a left-right direction in the drawing) perpendicular or substantially perpendicular to the front-rear direction of the vehicle to hold first main shaft 710 and second main shaft 720 from opposite lateral sides of the vehicle.

First clutch 74 is provided between crankshaft and first main shaft 710. In an engaging state, first clutch 74 transmits to first main shaft 710 rotational power supplied from the engine through crankshaft 60. In a free state, first clutch 74 blocks the transmission of rotational power from the engine to first main shaft 710. The torque transmitted to first main shaft 710 is outputted from drive shaft 730 through the desired pair of gears (a pair of gears in gears 711, 85, and 712 on first main shaft 710 and gears 81, 731, and 83 on drive shaft 730 corresponding to gears 711, 85, and 712) in the gears in the odd stages (gears, 81, 83, 85, 711, 712, and 731). First clutch is preferably a well-known friction clutch of a multiplate structure.

Figure 2:
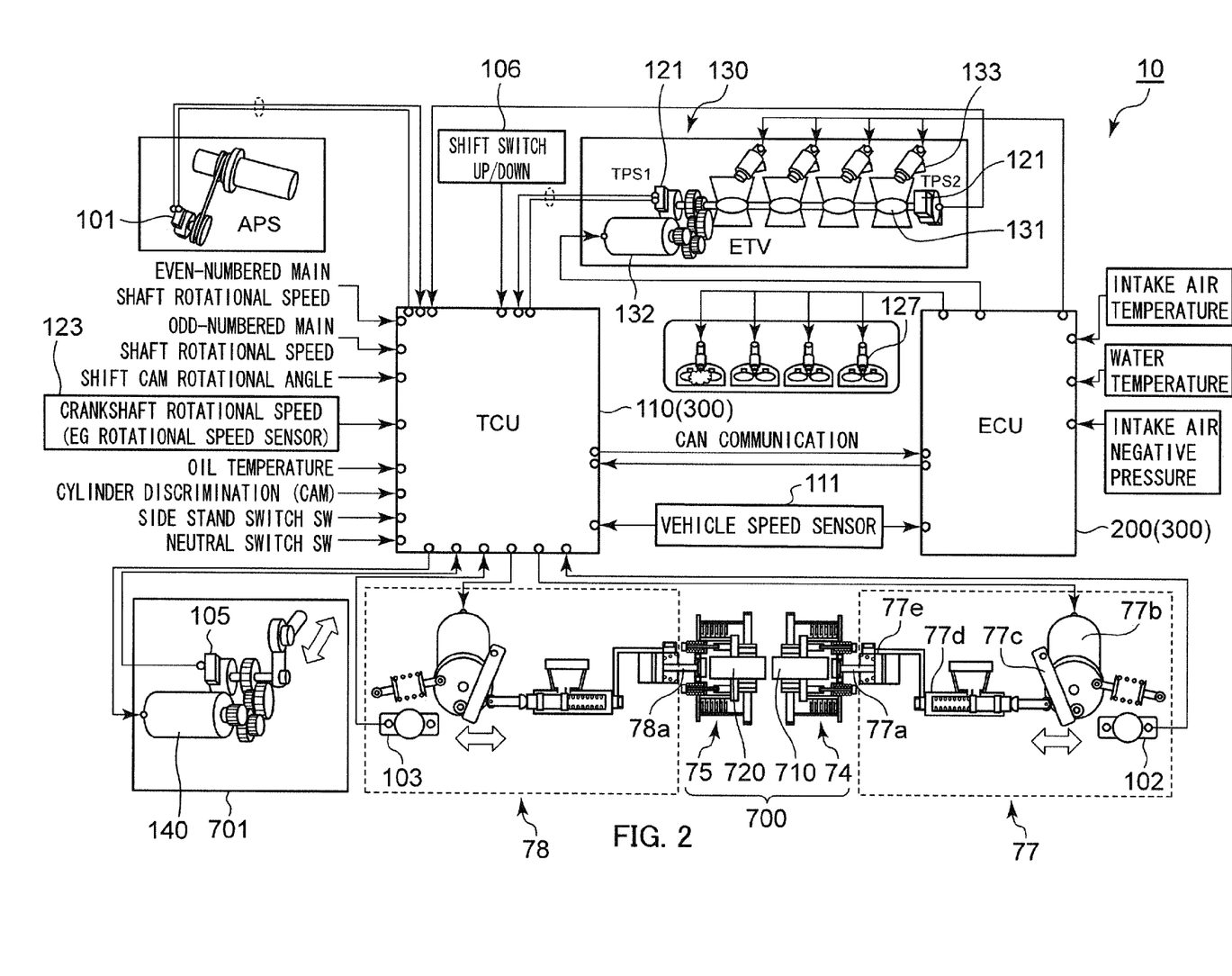
FIG. 2 is a schematic diagram showing a control system for a motorcycle including the control apparatus for the dual clutch transmission according to a preferred embodiment of the present invention.

First clutch 74 is connected to first pull rod 77a of first clutch actuator 77 controlled by a transmission control unit (TCU 110 shown in FIG. 2). In first clutch 74, when first pull rod 77a is moved in the direction away from first clutch 74, a plurality of clutch plates and a plurality of friction plates are separated from each other to cut the transmission of a torque from first input gear 40 to first main shaft 710, that is, to block the transmission of power to first main shaft 710. On the other hand, when first pull rod 77a is moved toward first clutch 74, the plurality of clutch plates and the plurality of friction plates attach closely to each other to transmit a torque to first main shaft 710, that is, to transmit power through odd-numbered gears including a group of odd gears (first gear 81, third gear 83 and fifth gear 85).

Second clutch 75 is provided between crankshaft 60 and second main shaft 720. Second clutch 75 is preferably a friction clutch having a multiplate structure, as is first clutch 74. In an engaging state, second clutch 75 transmits to second main shaft 720 rotational power supplied from the engine through crankshaft 60. In a free state, second clutch 75 blocks rotational power from the engine to second main shaft 720. The torque transmitted to second main shaft 720 is outputted from drive shaft 730 through the desired pair of gears (a pair of gears in gears 721, 86, and 722 on second main shaft 720 and gears 82, 732, and 84 on drive shaft 730 corresponding to gears 721, 86, and 722) in the gears in the even stages (gears, 82, 84, 86, 721, 722, and 732).

Second clutch 75, which is preferably a well-known clutch having a multiplate structure, as is first clutch 74, is connected to second pull rod 78a of second clutch actuator 78 controlled by transmission control unit 110. In second clutch 75, when second pull rod 78a is moved in the direction away from second clutch 75, a plurality of clutch plates and a plurality of friction plates are separated from each other to cut the transmission of a torque from second input gear 50 to second main shaft 720, that is, to block the transmission of power to second main shaft 720. On the other hand, when second pull rod 78a is moved toward second clutch 75, the plurality of clutch plates and the plurality of friction plates attach closely to each other to transmit a torque to second main shaft 720, that is, to transmit power through even-numbered gears including a group of even gears (second gear 82, fourth gear 84 and sixth gear 86).

Thus, first clutch 74 and second clutch 75 are driven and controlled by control unit 300 (more specifically by TCU 110 shown in FIG. 2) through first clutch actuator 77 and second clutch actuator 78.

Gear shifting to be performed on gears 81 to 86, 711, 712, 721, 722, 731, and 732 in transmission mechanism 700 is performed with shift forks 141 to 144 movable with the rotation of shift cam 14 in shift mechanism 701.

Shift mechanism 701 includes shift forks 141 to 144, shift cam 14, shift cam drive apparatus 800 that rotatingly drives shift cam 14, motor 140, and transfer mechanism 41 that connects motor 140 and shift cam drive apparatus 800 and transmits the driving force of motor 140 to shift cam drive apparatus 800.

Shift forks 141 to 144 extend between spline gears 731, 712, 722, and 732, respectively, and shift cam 14. Shift forks 141 to 144 are spaced apart from each other along the axial directions of first and second main shafts 710 and 720, drive shaft 730 and shift cam 14. Shift forks 141 to 144 are placed parallel or substantially parallel to each other, each fork being movable along the axial direction of the axis of rotation of shift cam 14.

Shift forks 141 to 144 include pin portions on their base ends movably disposed respectively in four cam grooves 14a to 14d provided on the outer circumferential surface of shift cam 14. In other words, shift forks 141 to 144 are driven members on shift cam 14 provided as a drive member. Shift forks 141 to 144 are slidingly moved along the axial directions of first and second main shafts 710 and 720 and drive shaft 730 according to the profiles of cam grooves 14a to 14d of shift cam 14. By this sliding movement, each of spline gears 731, 712, 722, and 732 connected to the extreme end is moved along the axial direction on the shaft passed through its bore.

Shift cam 14 has a cylindrical shape and is disposed so that the axis of rotation is parallel or substantially parallel to first main shaft 710, second main shaft 720 and drive shaft 730.

Shift cam 14 is driven and rotated by the driving force of motor 140 transmitted to shift cam drive apparatus 800 through transfer mechanism 41. By this rotation, at least one of shift forks 141 to 144 is moved along the axial direction of the axis of rotation of shift cam 14 according to the profiles of cam grooves 14a to 14d.

With the movements of some of shift forks 141 to 144 movable by following the rotation of shift cam including such cam grooves 14a to 14d, the spline gears connected to the moving shift forks are moved, thus performing gear shifting in transmission 70 (speed change mechanism 700).

In transmission 70, the driving force of the engine from crankshaft 60 is outputted through drive shaft 730 through one of the two independent systems including first main shaft 710 and second main shaft 720 by the operations of first clutch 74 and second clutch 75 and the corresponding operation of shift mechanism 701. With the rotation of drive shaft 730, driven sprocket 76 rotates to drive the rear wheel through the chain.

Shift mechanism 701 that drives first clutch 74, second clutch 75, and shift forks 141 to 144 in transmission 70 is controlled by control unit 300 of control system 10 (see FIG. 2).

FIG. 2 is a schematic diagram showing the control system for the motorcycle including the control apparatus for the dual clutch transmission according to a preferred embodiment of the present invention. In FIG. 2, the body of the engine is not illustrated.

In control system (control apparatus) 10 shown in FIG. 2, control unit 300 includes TCU (transmission control unit) 110 and ECU (engine control unit) 200. Between transmission control unit 110 and engine control unit 200, various sorts of data are exchanged as information by data communication such as CAN communication.

Control system 10 includes accelerator opening sensor (accelerator position sensor) 101, clutch position sensors (clutch angle sensors) 102 and 103, shift position sensor (transmission stage detection unit) 105, shift switch 106, first clutch actuator 77, second clutch actuator 78, shift mechanism 701 and output shaft rotational speed detecting sensor (referred to as "vehicle speed sensor") 111 as well as transmission control unit 110 and engine control unit 200.

Accelerator opening sensor 101 detects the opening amount of the driver's operation on the accelerator and outputs the detected operation amount to transmission control unit 110.

Clutch position sensors 102 and 103 detect positions of the respective clutches, i.e., the state of engagement in first clutch 74 attained by first clutch actuator 77 and the state of engagement in second clutch 75 attained by second clutch actuator 78, and output the detected clutch positions to transmission control unit 110. More specifically, clutch position sensor 102 outputs, from the angle of rotation of motor 77b, the amount of separation between a plurality of clutch plates and a plurality of friction plates adjusted by first pull rod 77a, i.e., the state of engagement in first clutch 74, to transmission control unit 110. Clutch position sensor 103 preferably has the same construction and the same function as clutch position sensor 102 and outputs the amount of separation between a plurality of clutch plates and a plurality of friction plates in second clutch 75, i.e., the state of engagement in second clutch 75 to transmission control unit 110.

Vehicle speed sensor (output shaft rotational speed detecting sensor) 111 detects the rotational speed of drive shaft 730 in transmission 70 (the drive shaft rotational speed corresponding to the vehicle speed) and outputs the detected rotational speed to transmission control unit 110 and engine control unit 200.

Shift position sensor 105 detects the position of the gears defining the predetermined transmission stages (the first to sixth gears, neutral) by the operation of motor 140 in shift mechanism 701 and outputs the detected gear position to transmission control unit 110.

Shift switch 106 includes a shift-up button and a shift-down button (not illustrated). By depressing the shift-up button or the shift-down button, transmission 70 achieves gear changes.

That is, when the driver depresses the shift-up button or the shift-down button of shift switch 106, a signal indicating that the button has been depressed (hereinafter referred to as "shift signal") is outputted from shift switch 106 to control unit 300. Control unit 300 is programmed to control first and second clutch actuators 77 and 78 and motor 140 based on this inputted shift signal. By this control, one of first and second clutches 74 and 75 or both clutches 74 and 75 are disconnected and shift cam 14 is rotated so that transmission 70 (more specifically transmission mechanism 700) performs gear shifting.

In the present preferred embodiment, an upshift operation is executed in transmission 70 in response to depressing the shift-up button by the driver, and a downshift operation is executed in transmission 70 in response to depressing the shift-down button by the driver.

First clutch actuator 77 adjusts an engaging force applied to first main shaft 710 in first clutch 74, i.e., a torque transmitted from first clutch 74 to first main shaft 710, based on a control command from transmission control unit 110. Transmission of power from the engine to first main shaft 710 or blocking of the transmission of the power from the engine to first main shaft 710 is performed in this manner to cause the vehicle to start or stop.

First clutch actuator 77 in the present preferred embodiment adjusts the torque transmitted through first clutch 74 by hydraulic pressure. In first clutch actuator 77, motor 77b drive-controlled by transmission control unit 110 drives master cylinder 77d through a link 77c to supply a hydraulic operating fluid to slave cylinder 77e. By the hydraulic operating fluid flowing into slave cylinder 77e, first pull rod 77a, urged toward first clutch 74 is moved in the direction away from first clutch 74. In first clutch 74, the engaging force, i.e., the transmitted torque, is thus reduced to block power from the engine (more specifically crankshaft 60) to first main shaft 710. With the movement of first pull rod 77a in a manner of being moved in the direction away from first clutch 74 as described above, first clutch 74 is made free. Also, first pull rod 77a driven by motor 77b is released from the state of being moved in the direction away from first clutch 74 to move toward first clutch 74. The clutching force (engaging force) of first clutch 74 is thus increased, so that the torque transmitted from the engine to first main shaft 710 is increased. At this time, first clutch 74 is in such a state that a certain torque is transmitted from the engine to first main shaft 710 through first clutch 74, i.e., in a clutching state.

Second clutch actuator 78 adjusts an engaging force applied to second main shaft 720 in second clutch 75, i.e., a torque transmitted from second clutch 75 to second main shaft 720, based on a control command from transmission control unit 110. As a result, transmission of power from the engine to second main shaft 720 or blocking of the transmission of the power from the engine to second main shaft 720 is performed in this way to cause the vehicle to start or stop.

Second clutch actuator 78 preferably has a construction similar to that of first clutch actuator 77 and drives second clutch 75 by the same operation as that by which first clutch actuator 77 drives first clutch 74.

Further, first clutch actuator 77 and second clutch actuator 78 achieve gear changes during traveling by operating first clutch 74 and second clutch 75 so that the torque transmission path in the transmission is changed.

While first clutch actuator 77 and second clutch actuator 78 are assumed to be of a hydraulic type in this description, first clutch actuator 77 and second clutch actuator 78 may be of any other type, e.g., an electric-type if they are constructed so as to adjust the engaging forces applied to the clutches.

Shift mechanism 701 is an apparatus to select the desired gears. Shift mechanism 701 selectively operates shift forks 141 to 144 (see FIG. 1) mounted in the transmission based on a control command from transmission control unit 110 to connect at least one of first main shaft 710 and second main shaft 720, which are transmission input shafts with drive shaft 730, thus defining a predetermined transmission stage.

Throttle opening sensor 121 detects the opening amount of throttle valve 131 of electronically controlled throttle 130 and outputs a signal representing the opening amount to transmission control unit 110.

Engine rotational speed sensor 123 detects engine rotational speed (more specifically rotational speed of crankshaft 60) Ne and outputs a signal representing the engine rotational speed to transmission control unit 110.

The opening of throttle valve 131 from throttle opening sensor 121 and the engine rotational speed Ne from engine rotational speed sensor 123 are inputted from transmission control unit 110 to engine control unit 200 through CAN communication together with information including the signal from accelerator opening sensor 101. That is, information inputted to transmission control unit 110 is inputted to engine control unit 200, and information inputted to engine control unit 200 is also inputted to transmission control unit 110 through CAN communication. Thus, transmission control unit 110 and engine control unit 200 share the inputted information with each other. Engine control unit 200 controls driving of the engine by using information inputted in this manner.

Transmission control unit 110 and engine control unit 200 control the components of the vehicle by using the inputted information.

Engine control unit 200 receives a required torque command to determine the torque of the engine from transmission control unit 110 and controls the torque of the engine.

Based on the received required torque command, engine control unit 200 controls the torque produced by the engine by operating electronically controlled throttle 130 or by changing ignition timing with ignition 127.

Electronically controlled throttle 130, injectors 133 on the engine, and ignition 127 are connected to engine control unit 200. Engine control unit 200 controls the engine by using these connected components. Information including the intake air temperature, the water temperature, and the intake air negative pressure is inputted to engine control unit 200 from connected sensors.

Electronically controlled throttle 130 adjusts the opening of throttle valve 131 provided in the engine air intake system by driving motor 132 based on a control command from engine control unit 200.

The sensors provided on the motorcycle are connected to transmission control unit 110. From the sensors, information including the accelerator opening, the engine rotational speed, the rotational speed of first main shaft 710 (shown as "odd-numbered main shaft rotational speed" in FIG. 2), the rotational speed of second main shaft 720 (shown as "even-numbered main shaft rotational speed" in FIG. 2), the angle of rotation of shift cam 14, the rotational speed of drive shaft 730, the oil temperature, the position of first clutch 74, the position of second clutch 75, and the position of the electromagnetic throttle valve is inputted to transmission control unit 110. Also, side stand switch (side stand SW) information from a side stand switch (not illustrated) and neutral switch (neutral SW) information from a neutral switch are inputted to transmission control unit 110.

Also, transmission control unit 110 controls the operations of first clutch actuator 77, second clutch actuator 78, and shift mechanism 701 at a predetermined timing, based on the inputted signals. By the operations of first clutch actuator 77, second clutch actuator 78, and shift mechanism 701, first clutch 74, second clutch 75, and the transmission gear stages are operated to perform a transmission stage change operation.

More specifically, transmission control unit 110 calculates a target engine torque and a target clutch torque in response to a transmission stage command from shift switch 106 based on the inputted information items (the accelerator opening, the engine rotational speed, the rotational speed of first main shaft 710, the rotational speed of second main shaft 720, the rotational speed of drive shaft 730 and the angle of rotation of the shift cam).

Further, transmission control unit 110 calculates a target throttle opening, a target angle of rotation of shift cam 14 and a target clutch position in first clutch 74 or second clutch 75 based on the target engine torque and the target clutch torque.

By using the results of these calculations, transmission control unit 110 controls the operations of first clutch actuator 77, second clutch actuator 78, and shift mechanism 701, and determines, in a clutch interchange period, whether or not the clutch torque capacity of the engaging-side clutch has increased to a predetermined determination value, and if the clutch torque capacity of the engaging-side clutch has increased to the determination value, changes the path of transmission of the torque by reducing a clutch torque capacity of the release-side clutch.

In other words, as a transmission stage change operation to change the torque transmission path, in the clutch interchange period, if the clutch torque capacity of the clutch (engaging-side clutch) to transmit the torque next has not increased to the determination value, transmission control unit 110 ends the operation to change the path of transmission of the torque in a state in which a gear change is not performed, without reducing the clutch torque capacity of the clutch (release-side clutch) presently transmitting the torque.

In addition, in the clutch interchange period, transmission control unit 110 determines immobility in the engaging-side clutch as sticking, and when the sticking is determined, performs a withdrawal operation that returns the clutch torque capacity of the release-side clutch to the capacity thereof prior to changing the path of transmission of the torque.

The gear change period (also referred to as the clutch interchange period) is a period in which the torque transmission path is changed by the operation of first clutch 74 or second clutch 75, and which includes torque transmission preparation phase (also referred to as dog-in phase Dg_in_f), torque transmission path change phase (also referred to as torque phase Trq_f) and inertia phase Inti_f.

Torque transmission preparation phase Dg_in_f is a period to establish a state in which a clutch interchange operation can immediately be performed in a phase after torque transmission preparation phase Dg_in_f, e.g., torque transmission path change phase Trq_f. More specifically, in torque transmission preparation phase Dg_in_f, one of first clutch 74 and second clutch 75 that becomes an engaging-side clutch is set in a state so as to produce the torque capacity immediately after receiving an operation command. That is, in torque transmission preparation phase Dg_in_f, the engaging-side clutch is moved to a position corresponding to a state immediately before engaging (a state in which the plurality of clutch plates and the plurality of friction plates are close to each other immediately before contact with each other). This state of the clutch is also referred to below as a state in which the clutch is at an engagement-ready position.

With respect to first and second clutch actuators 77 and 78 in the present preferred embodiment, the torque transmission preparation phase Dg_in_f can also be said to be a period in which the pull rod of the clutch actuator for the engaging-side clutch is stroked to operate the engaging-side clutch to the engagement-ready position.

Torque transmission path change phase Trq_f is a period in which the clutches are actually operated, that is, the clutches are interchanged to change the torque transmission path, and which is a substantial gear change period. In the present preferred embodiment, transmission control unit 110 controls first clutch actuator 77 and second clutch actuator 78 to sequentially interchange the clutches one with another in torque transmission path change phase Trq_f.

In torque transmission path change phase Trq_f, transmission control unit 110 first operates the engaging-side clutch to set the clutch torque capacity on the engaging side to the target value, and thereafter operates the release-side clutch to set the clutch torque capacity on the release side to the target value.

In the present preferred embodiment, the target value of the clutch torque capacity in the engaging-side clutch is set to, for example, the engine torque (|Teg|) to be transmitted to the clutch part, while the target value of the clutch torque capacity on the release side is set to 0. That is, transmission control unit 110 operates the engaging-side clutch so that the value of the clutch torque capacity on the engaging-side is changed from 0 to the engine torque value, thereafter operates the release-side clutch so as to equalize the value of the clutch torque capacity on the release-side to 0, and makes the release-side clutch free.

In this torque transmission path change phase, the sum of the clutch torque capacity of the engaging-side clutch and the clutch torque capacity of the release-side clutch respectively operated by transmission control unit 110 is equal to or larger than the engine torque (|Teg|) and equal to or smaller than twice the engine torque (|Teg|).

Inertial phase Inti_f is a period in which correction of inertia accompanying change of the rotational speed is executed while an inputted rotational speed is changed to a value close to a rotational speed to be attained after the gear change. In other words, inertial phase Inti_f is a period in which the engine rotational speed is made equal to the rotational speed of the input shaft (first main shaft 710 or second main shaft 720) in a destination stage (next stage) in the gear change. When there is a difference between the engine rotational speed and the rotational speed of the input shaft in the destination stage, |the torque transmitted through the clutch (the torque actually transmitted)|=the clutch torque capacity (the maximum torque capacity by which the clutch can perform transmission). When there is no difference between the engine rotational speed and the rotational speed of the input shaft in the destination stage, |the torque transmitted through the clutch (the torque actually transmitted)|≤the clutch torque capacity (the maximum torque capacity by which the clutch can perform transmission). In inertial phase Inti_f, in a power-on upshift state, the engine rotational speed is adjusted with the engaging clutch.

In inertial phase Inti_f, for example, in a power-on upshift state, the gear change actually progresses in the transmission path in the transmission to reduce the rotational speed of the input shaft (first or second main shaft 710 or 720) after the completion of clutch interchange from the release side to the engaging side. That is, in inertial phase Inti_f, transmission control unit 110 sets the engaging-side clutch in an engaging state to transmit power to drive shaft 730 through the engaging-side clutch. On the other hand, the release-side clutch in inertial phase Inti_f is made free by transmission control unit 110 in order to disengage dogs operated in the gear change before the completion of gear change. The release-side clutch in inertial phase Inti_f is engaged after establishing a neutral state (freely rotatable stage) by disengaging the dogs.

The transmission stage change operation including the operations of first clutch 74 and second clutch 75 is performed by transmission control unit 110 by selecting a mode from four transmission control modes (also referred to as "control mode") according to a transmission command from the driver.

The four transmission control modes are modes according to transmission patterns to perform downshift during acceleration of the vehicle, upshift during acceleration, downshift during deceleration and upshift during deceleration.

In the gear change period in each of these four transmission control modes, transmission control unit 110 performs transmission control by controlling the operation of first clutch 74 through first clutch actuator 77 and controlling the operation of second clutch 75 through second clutch actuator 78. The gear change period in each transmission control mode is constituted of torque transmission preparation phase Dg_in_f, torque transmission path change phase Trq_f and inertia phase Inti_f.

According to the present preferred embodiment, when a clutch, particularly the engaging-side clutch, has malfunctioned (stuck), the malfunction behavior of the clutch is significantly reduced or prevented.

The fail-safe control can be similarly executed in the second quadrant, third quadrant, and fourth quadrant, and not just in the power-on upshift state of the first quadrant. In the second quadrant, third quadrant, and fourth quadrant, if the fail-safe control is not executed, engine rotational speed we decreases and thereafter a deceleration shock is caused when engaging the release side. To avoid this situation, a configuration is adopted that disconnects the release side after the torque on the engaging side increases.

That is, among the control modes performed by transmission control unit 110 according to a transmission command from the driver, a state in which the engine torque is positive (power-on) when the engine torque is expressed by "positive/negative", and a shift to a higher one of the transmission stages (upshift) is made is the power-on upshift state.

This power-on upshift state is a state in which a shift to a higher one of the transmission stages is made during acceleration, for example, an upshift from the first gear to the second gear is made during vehicle traveling. In the gear change period in the control mode of the power-on upshift state, transitions are made in order of torque transmission preparation phase Dg_in_f, torque transmission path change phase Trq_f and inertia phase Inti_f.

The engine torque is positive (power-on) when the engine torque is expressed by "positive/negative", and a shift to a lower one of the transmission stages (downshift) is made. This state is caused by so-called kickdown and will be referred to as "power-on downshift state". This power-on downshift state is a state in which, for example, a shift to a lower one of the transmission stages is made to increase the torque on the drive wheel, and the load on the drive wheel is increased as in the case of uphill traveling. A similar problem as that in the power-on upshift state occurs in the power-on downshift state also.

Transmission control in transmission 70 in the motorcycle including control system 10 when the motorcycle is traveling will be described with reference to FIG. 3 to FIG. 5.

Figure 3:
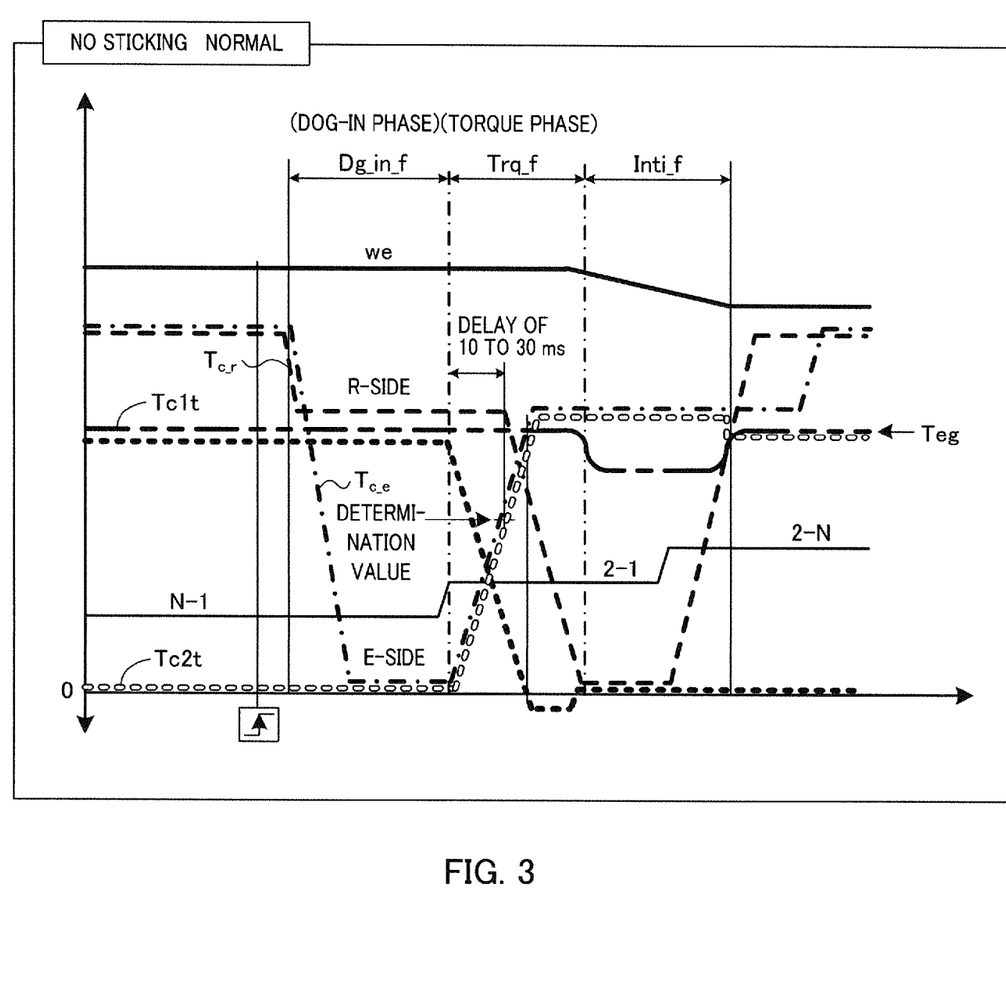
FIG. 3 is a time chart showing changes in torque and changes in rotational speed corresponding to a clutch operation at a normal time at which sticking does not occur in an engaging-side clutch in a torque transmission path change phase Trq_f.
Figure 4:
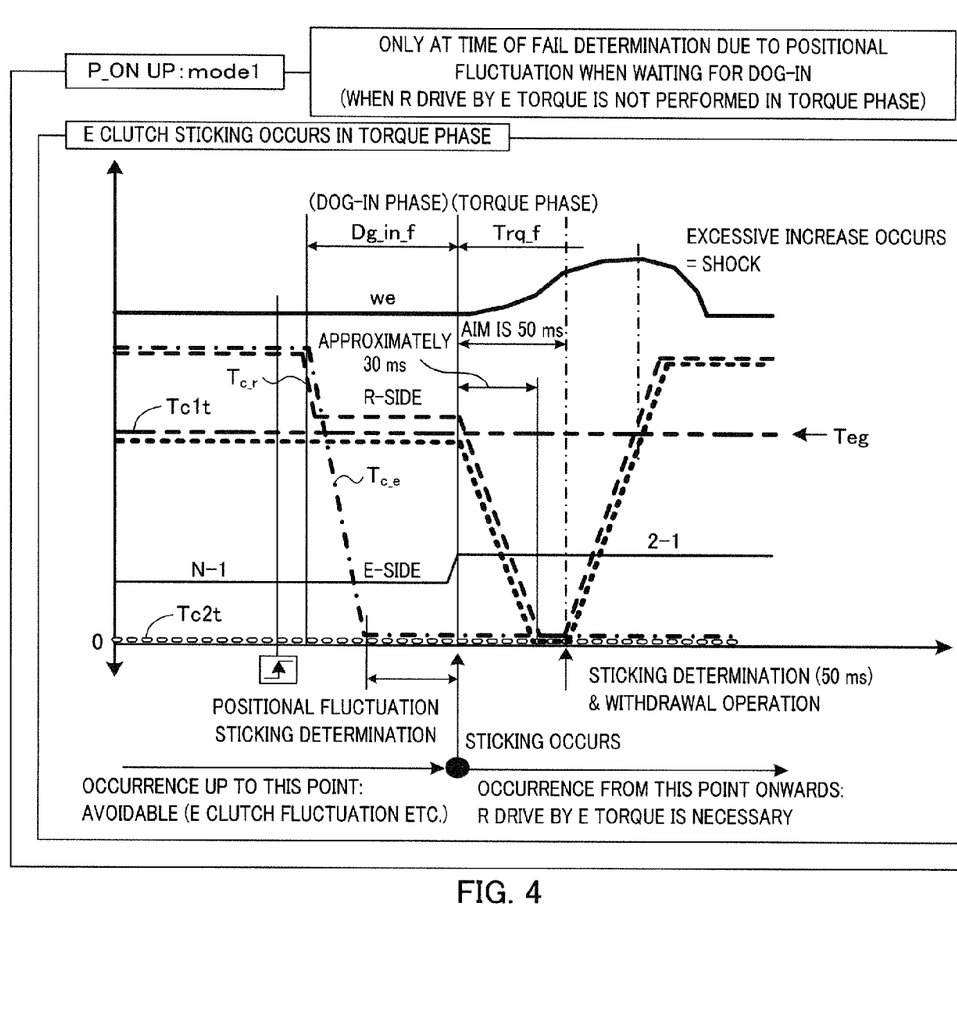
FIG. 4 is a time chart showing changes in torque and changes in rotational speed corresponding to an operation when sticking occurs in the engaging-side clutch in the torque transmission path change phase Trq_f in a case where a fail-safe control is not performed.
Figure 5:
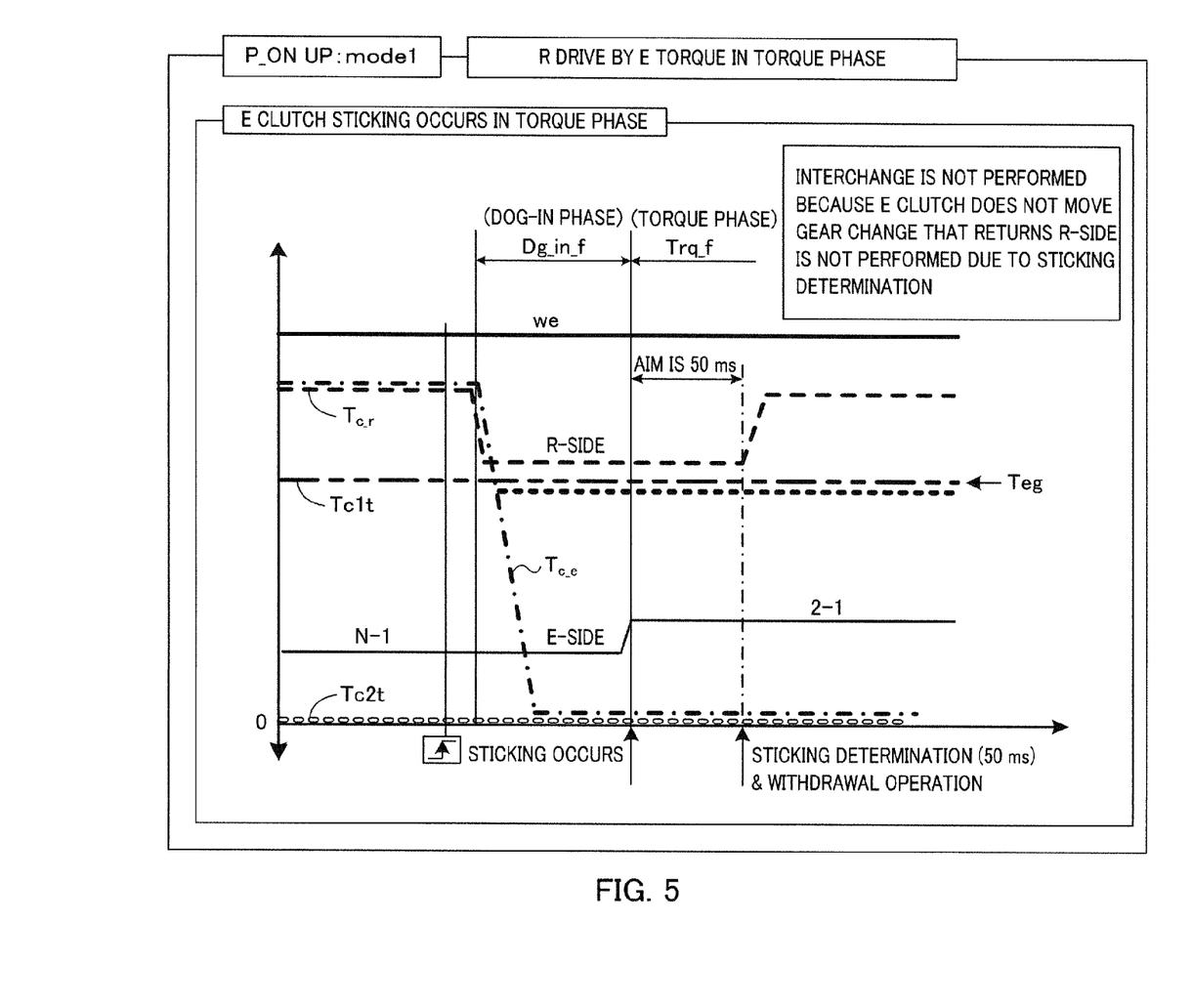
FIG. 5 is a time chart showing changes in torque and changes in rotational speed corresponding to a clutch operation after a fail-safe control is performed.

FIG. 3 to FIG. 5 are time charts showing changes in torque and changes in rotational speed corresponding to the clutch operation when performing a power-on upshift operation.

In FIG. 3 to FIG. 5, Tc_r is the torque capacity of the release-side (abbreviated as "R-side" in the figure) clutch; Tc_e is the torque capacity of the engaging-side (abbreviated as "E-side" in the figure) clutch; Tc_t is the sum of the torques transmitted through the two clutches; we is the engine rotational speed; and −Teg and Teg are engine torque values. The torque transmission preparation phase, the torque transmission path change phase and the inertia phase in the gear change period are denoted by Dg_in_f, Trq_f, and Inti_f, respectively.

In FIG. 3 to FIG. 5, in the plurality of graphs superposed one on another on the common abscissa, horizontally overlapping portions are shown in a slightly shifted state for convenience sake. For example, graph Teg, Tc_r, and Tc_e portions in torque transmission path change phase Trq_f in FIG. 3 are superposed one on another in actuality.

Based on the inputted information, transmission control unit 110 controls drive of first clutch 74 through first clutch actuator 77 and controls drive of second clutch 75 through second clutch actuator 78. By controlling drive of first clutch 74 and second clutch 75 in this way, transmission control unit 110 makes free the clutch presently transmitting the torque and engages the clutch that transmits the torque to the pair of gears after shifting.

First, simultaneous interchange of both the release-side clutch and the engaging-side clutch in torque transmission path change phase Trq_f will be described.

FIG. 3 is a time chart showing changes in torque and changes in rotational speed corresponding to a clutch operation at a normal time at which sticking does not occur in an engaging-side clutch in the torque transmission path change phase Trq_f.

In control mode 1 that performs transmission control at a time of power-on and upshift that is shown in FIG. 3, transmission control unit 110 first performs a torque transmission preparation operation in torque transmission preparation phase Dg_in_f.

That is, in control mode 1, transmission control unit 110 controls the clutch presently transmitting the torque (also referred to as "release-side clutch") among first clutch 74 and second clutch 75 in torque transmission preparation phase Dg_in_f to reduce the torque capacity Tc_r of the release-side clutch without reducing the transmitted torque (the sum Tc_t of the torques on clutches transmitted through the two clutches to the main shafts). Also, transmission control unit 110 controls the clutch that performs subsequent torque transmission (also referred to as "engaging-side clutch") in torque transmission preparation phase Dg_in_f in control mode 1 to reduce the torque capacity Tc_e of the engaging-side clutch without reducing the transmitted torque (the sum Tc_t of the torques on clutches transmitted through the two clutches to the main shafts).

More specifically, in torque transmission preparation phase Dg_in_f, the engaging-side clutch transmits no torque.

That is, the dogs on the power transmission path through the engaging-side clutch are out of engagement while the clutch is held in engagement. Accordingly, in torque transmission preparation phase Dg_in_f, transmission control unit 110 controls the engaging-side clutch to free the engaging-side clutch held in engagement, moves the engaging-side clutch to the preparatory position for interchange by engaging the gears in the next stage (more specifically, engaging the dogs), and engages the dogs.

Also, in torque transmission preparation phase Dg_in_f in control mode 1, transmission control unit 110 controls the release-side clutch to reduce the torque capacity Tc_r of the release-side clutch to a value substantially equal to that of engine torque Teg.

Thereafter, in torque transmission path change phase Trq_f, transmission control unit 110 operates the engaging-side clutch to increase the clutch capacity Tc_e of the engaging-side clutch from 0 to the target value (engine torque Teg in this case) while maintaining the torque capacity Tc_r of the release-side clutch at engine torque Teg.

As shown in FIG. 3, in torque transmission path change phase Drq_f, after setting the clutch capacity Tc_e of the engaging-side clutch to the value corresponding to the engine torque (Teg) as described above, transmission control unit 110 operates the release-side clutch and disconnects this clutch. That is, the clutch capacity Tc_r of the release-side clutch maintained at the engine torque (Teg) is reduced to 0.

In this way, transmission control unit 110 performs simultaneous interchange of the clutches to change the torque transmission path in the transmission in torque transmission path change phase Trq_f.

The foregoing describes interchange control of the clutches at a normal time at which sticking does not occur in the engaging-side clutch.

Next, fail-safe control of the clutches in torque transmission path change phase Drq_f will be described.

As described above, a malfunction (sticking) sometimes occurs in the engaging-side clutch when interchanging the clutches. If a malfunction (sticking) occurs in the engaging-side clutch when interchanging the clutches, when in the power-on upshift state, since both clutches are disconnected, the engine rotational speed increases excessively and a shock is caused. A malfunction (sticking) in the engaging-side clutch is difficult to forecast until clutch interchange is actually performed. Furthermore, since a certain time period (50 ms, for example) is required to determine the sticking, the occurrence of an excessive increase in the engine rotational speed cannot be prevented.

FIG. 4 is a time chart showing changes in torque and changes in rotational speed corresponding to an operation when sticking occurs in the engaging-side clutch in torque transmission path change phase Trq_f in a case where the fail-safe control is not performed. In FIG. 4, the torque capacity Tc_r of the release-side clutch, the torque capacity Tc_e of the engaging-side clutch, the sum of the torques transmitted through the two clutches Tc_t, engine rotational speed we, the engine torque |Teg|, torque transmission preparation phase Dg_in_f, torque transmission path change phase Trq_f, and inertia phase Inti_f are shown. In FIG. 4, similarly to FIG. 3, a plurality of graphs that are disposed at overlapping positions are shown in a slightly shifted state for convenience sake.

As shown in FIG. 4, if a malfunction (sticking) occurs in the engaging-side clutch when interchanging the clutches, since both clutches are disconnected, the engine rotational speed we increases excessively. That is, even though it is attempted to engage the engaging-side clutch, the engaging-side clutch sticks and does not engage and the engaging-side clutch is stopped in a disconnected state. When the release-side clutch is disconnected without taking this fact into consideration, since the engaging-side clutch does not engage, the engine rotational speed we increases excessively. This situation also occurs in a similar manner when performing a power-on downshift operation.

Furthermore, it is not possible to know in advance that sticking will occur in the engaging-side clutch. This is because the state is normal until the time point that the engaging-side clutch is disconnected, and the sticking occurs after the engaging-side clutch is disconnected. In addition, a considerable time period is required in order to determine the occurrence of sticking. For example, as shown in FIG. 4, in torque transmission preparation phase Dg_in_f, transmission control unit 110 controls the release-side clutch to reduce the torque capacity Tc_r of the release-side clutch and operates the engaging-side clutch to attempt to increase the clutch capacity Tc_e of the engaging-side clutch from 0 to the target value (see FIG. 3). However, since sticking occurs in the engaging-side clutch, the engaging-side clutch does not engage. Regardless of that fact, transmission control unit 110 reduces the torque capacity Tc_r of the release-side clutch (approximately 30 ms, for example, in the example shown in FIG. 4). On the other hand, as shown in FIG. 4, the time period required to determine the occurrence of sticking is approximately 50 ms, for example, and this is longer than the time period taken for the torque capacity Tc_r of the release-side clutch (approximately 30 ms, for example) to decrease to 0. Consequently, engine rotational speed we increases excessively. From the viewpoint of ensuring determination accuracy, approximately 50 ms, for example, is required as the aforementioned time period to determine the occurrence of sticking. The manner in which the occurrence of sticking is determined is described below referring to FIG. 6.

According to the present preferred embodiment, when sticking occurs in the engaging-side clutch, the malfunction behavior of the clutch is significantly reduced or prevented.

More specifically, as shown in FIG. 3, in a clutch interchange period, transmission control unit 110 determines whether or not the clutch torque capacity of the engaging-side clutch has increased to a predetermined determination value, and if the clutch torque capacity of the engaging-side clutch has increased to the determination value, transmission control unit 110 changes the path of transmission of the torque by reducing the clutch torque capacity of the release-side clutch. A delay from the time that the clutch torque capacity of the engaging-side clutch increases to the determination value until that increase acts as a trigger for transmission control unit 110 to begin to decrease the clutch torque capacity of the release-side clutch is between 10 ms and 30 ms, for example.

As a determination value, transmission control unit 110 previously sets a clutch torque capacity that is less than a target value of the clutch torque capacity of the clutch in the next stage and that is at a time that is shorter than the maximum time (approximately 50 ms, for example) required to determine sticking. In the case illustrated in FIG. 3, the determination value is an engine torque that occurs at a time point between 10 and 30 ms, for example, after the start of torque transmission path change phase Drq_f.

As shown in FIG. 4, when sticking occurs in the engaging-side clutch, even if transmission control unit 110 controls the operations of first clutch actuator 77, second clutch actuator 78, and shift mechanism 701 to attempt to raise the clutch torque capacity of the engaging-side clutch to the target value, the clutch torque capacity of the engaging-side clutch does not increase. Conventionally, since the torque capacity Tc_r of the release-side clutch has been reduced during this period, engine rotational speed we will have increased excessively.

According to the present preferred embodiment, as shown in FIG. 4, in the clutch interchange period, when the clutch torque capacity of the engaging-side clutch does not increase to the determination value, transmission control unit 110 does not reduce the clutch torque capacity of the release-side clutch. In the case of the occurrence of sticking illustrated in FIG. 3, since the clutch torque capacity of the engaging-side clutch does not increase at all, and accordingly the clutch torque capacity of the engaging-side clutch does not reach the determination value, transmission control unit 110 does not begin to reduce the clutch torque capacity of the release-side clutch. Thereafter, transmission control unit 110 ends the operation to change the path of transmission of the torque in a state in which a gear change is not performed.

FIG. 5 is a time chart showing changes in torque and changes in rotational speed corresponding to a clutch operation after the fail-safe control is performed.

As shown in FIG. 5, when sticking occurs in a clutch interchange period, since the clutch torque capacity of the engaging-side clutch does not increase to the determination value, transmission control unit 110 does not reduce the clutch torque capacity of the release-side clutch. Thereafter, transmission control unit 110 ends the operation to change the path of transmission of the torque in a state in which a gear change is not performed. That is, since the engaging-side clutch does not move, clutch interchange is not performed.

In addition, in the clutch interchange period, transmission control unit 110 determines immobility in the engaging-side clutch as sticking, and when the sticking is determined, performs a withdrawal operation that returns the clutch torque capacity of the release-side clutch to the capacity thereof prior to changing the path of transmission of the torque.

Figure 6:
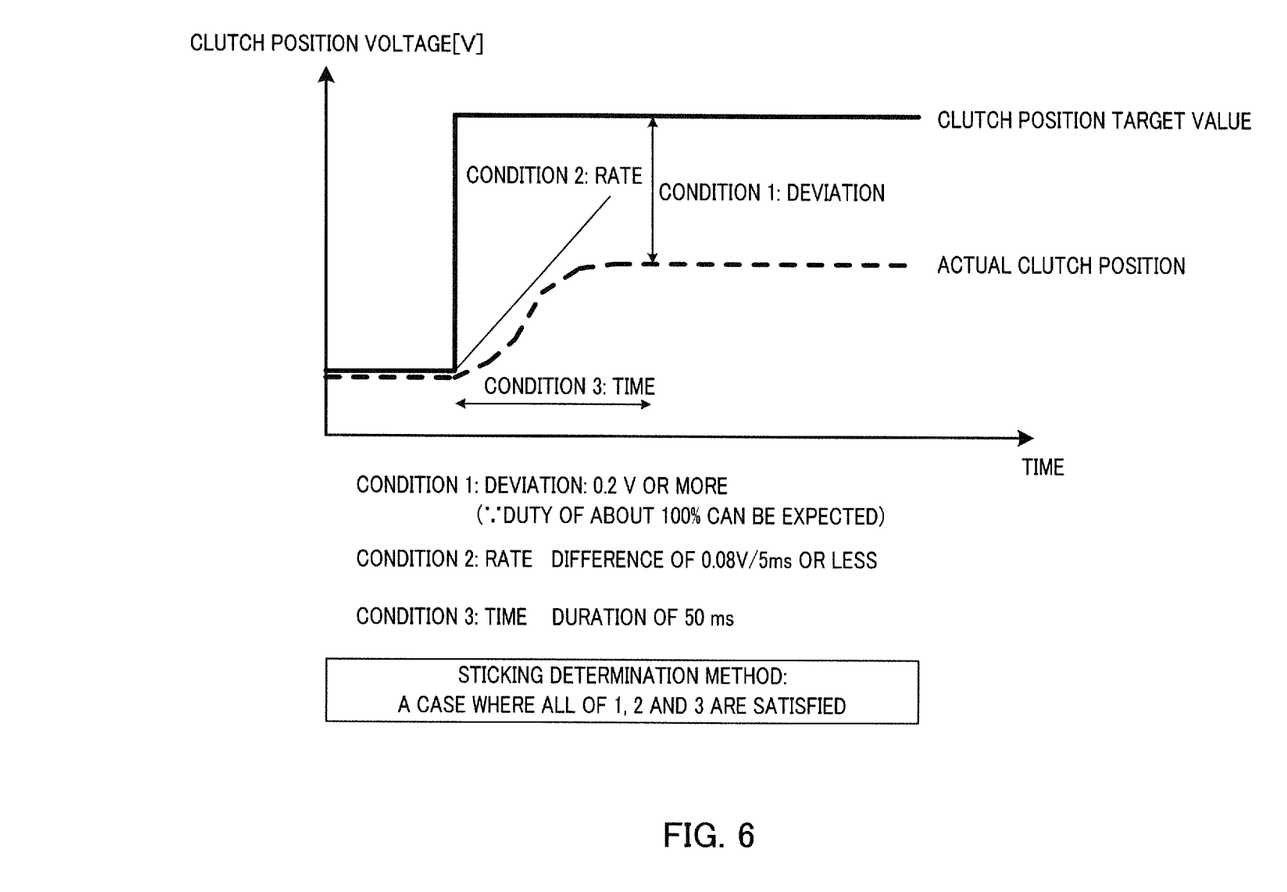
FIG. 6 is a diagram for explaining a method of determining clutch sticking.

FIG. 6 is a diagram showing a method of determining clutch sticking. The ordinate in FIG. 6 represents clutch position voltage and the abscissa represents a lapse of clutch operation time.

In the present preferred embodiment, the occurrence of clutch sticking is determined when all conditions 1 to 3 shown below are satisfied.

Condition 1: A deviation between the clutch position target value and the actual clutch position is 0.2 V, for example, or more.

Condition 2: A difference in the rate at which the actual clutch position follows the clutch position target value is 0.08 V/5 ms, for example, or less.

Condition 3: The duration for which the actual clutch position follows the clutch position target value at a certain rate is 50 ms, for example.

The above conditions 1 to 3 are only a non-limiting example. A combination of conditions selected from conditions 1 to 3 may be used.

Figure 7:
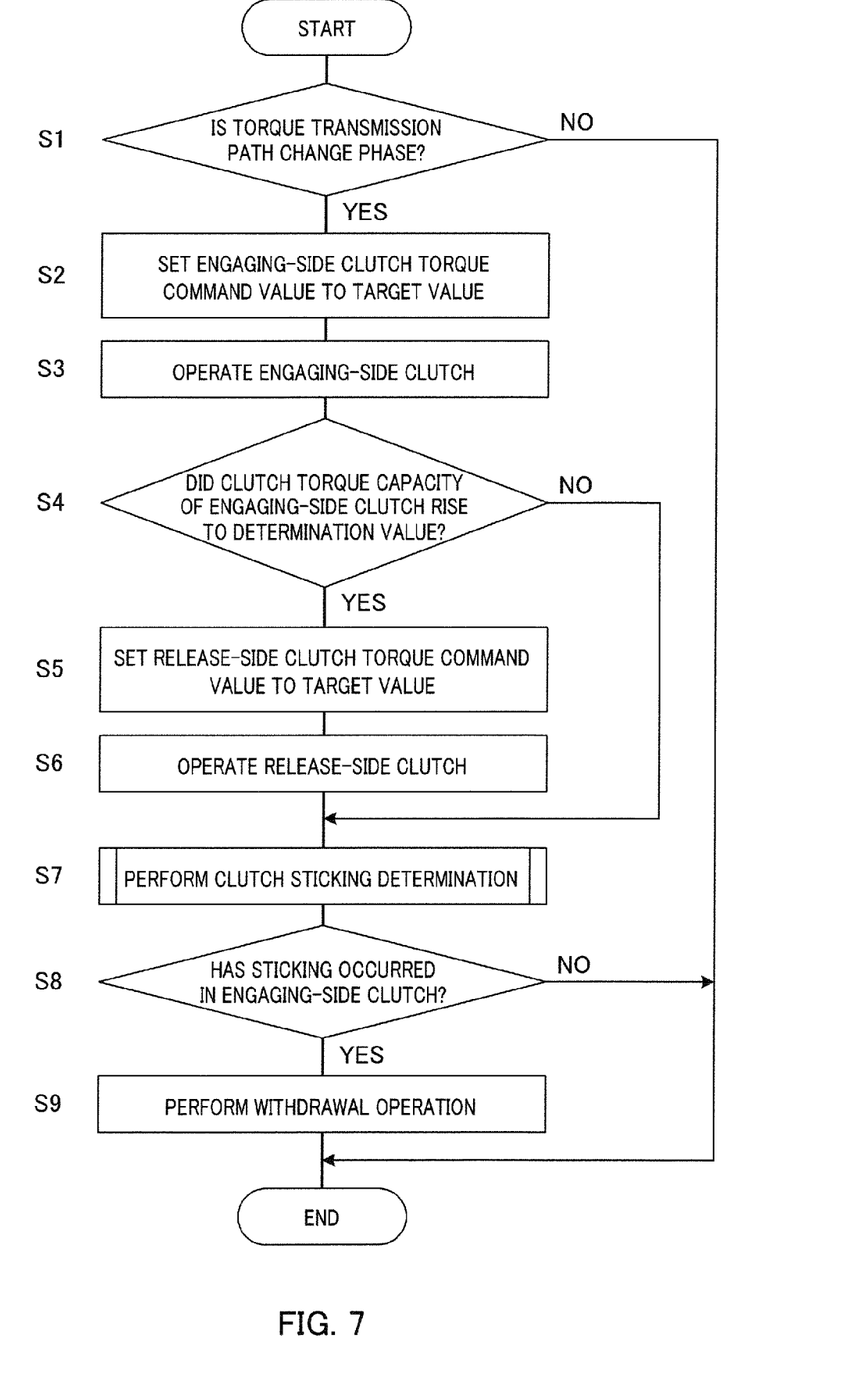
FIG. 7 is a flowchart of a fail-safe control operation.

FIG. 7 is a flowchart of a fail-safe control operation. S in FIG. 7 denotes each step in the flow.

After positioning the engaging-side clutch at the preparatory position for interchange in torque transmission preparation phase Dg_in_f, in step S1, transmission control unit 110 determines whether or not the present phase is torque transmission path change phase Trq_f based on clutch position information that shows the engaging state of the clutch that is inputted from a clutch position sensor, that is, the clutch torque capacity. If the present phase is not torque transmission path change phase Trq_f, this flow ends.

In step S2, transmission control unit 110 sets a torque command value of the engaging-side clutch to the target value (Teg in this case), and then the process proceeds to step S3 to operate the engaging-side clutch. In step S3, transmission control unit 110 operates the engaging-side clutch so that the engaging-side clutch capacity becomes the target value (engine torque Teg).

In step S4, transmission control unit 110 determines whether or not the clutch torque capacity of the engaging-side clutch has increased to the predetermined determination value.

If the clutch torque capacity of the engaging-side clutch has increased to the predetermined determination value, in step S5, transmission control unit 110 sets the torque command value of the release-side clutch to the target value (0 in this case), and the process proceeds to step S6. In step S6, by outputting the torque command value to the clutch actuators, transmission control unit 110 causes the clutch actuators to operate so as to reduce the clutch torque capacity of the release-side clutch so as to become the target value.

In contrast, if the clutch torque capacity of the engaging-side clutch does not increase to the predetermined determination value in the aforementioned step S4, the process proceeds directly to step S7. That is, if the clutch torque capacity of the engaging-side clutch does not increase to the predetermined determination value, transmission control unit 110 ends the operation to change the path of transmission of the torque in a state in which a gear change is not performed, without reducing the clutch torque capacity of the release-side clutch.

In step S7, transmission control unit 110 makes a determination regarding the occurrence of sticking in the engaging-side clutch in accordance with FIG. 6, and the process proceeds to step S8. In step S8, transmission control unit 110 determines whether or not sticking has occurred in the engaging-side clutch. If sticking occurs, in step S9, transmission control unit 110 performs a withdrawal operation to return to the state before changing the path of transmission of the torque, and the process ends. Further, in the aforementioned step S8, if sticking does not occur in the engaging-side clutch, the process ends directly.

After performing the fail-safe control process in the torque transmission path change phase Trq_f in this manner, transmission control unit 110 operates the clutches in inertia phase Inti_f. In inertia phase Inti_f, transmission control unit 110 performs control to transmit power to drive shaft 730 through the engaging-side clutch held in engagement to set the torque capacity Tc_e of the engaging-side clutch in this phase to a value equal to or larger than engine torque Teg.

Also in inertia phase Inti_f, while making the release-side clutch free, transmission control unit 110 drives shift mechanism 701 to disengage the dogs in the transmission path including the release-side clutch to establish a neutral state (freely rotatable state), and thereafter engages the release-side clutch. Also in inertia phase Inti_f, the engine rotational speed is synchronized with the rotational speed of the transmission path through the engaging-side clutch.

An inertial torque is produced by this change in engine rotational speed we. In this state, the dogs on the first gear side that have been transmitting a driving force in the transmission path on the release-side clutch side are disengaged to set the release-side clutch capacity Tc_r to a neutral state, and the clutch is thereafter engaged. Different operations corresponding to this operation are performed according to other transmission systems. For example, in a pre-shifting-type system, dogs that transmit a torque to the next-stage pair of gears are engaged in advance and a clutch capable of transmitting the torque to the next-stage pair of gears is set in a disconnected standby stage.

As described above in detail, in dual clutch transmission 70 of the present preferred embodiment, transmission control unit 110 controls the operations of first clutch actuator 77, second clutch actuator 78, and shift mechanism 701, and in the clutch interchange period, determines whether or not the clutch torque capacity of the engaging-side clutch has increased to the predetermined determination value. If the clutch torque capacity of the engaging-side clutch has increased to the determination value, transmission control unit 110 changes the path of transmission of the torque by reducing the clutch torque capacity of the release-side clutch. That is, when the clutch torque capacity of the engaging-side clutch does not increase to the determination value, the operation to change the path of transmission of the torque is ended in a state in which a gear change is not performed, without reducing the clutch torque capacity of the release-side clutch.

As a result, in the clutch interchange period, an excessive increase in the engine rotational speed can be prevented even when sticking occurs in the engaging-side clutch. Thus, the occurrence of a shock can be prevented and the influence of a clutch malfunction on the vehicle can be significantly reduced or prevented.

The control apparatuses for the dual clutch transmission according to preferred embodiments of the present invention are not limited to the above-described preferred embodiments. Various modifications and changes can be made in the preferred embodiments.

While a hardware configuration for preferred embodiments of the present invention have been described by way of example, preferred embodiments of the present invention can also be implemented using software. For example, an algorithm for the control method for the dual clutch transmission according to preferred embodiments of the present invention may be described in a programming language, and this program may be stored in a memory and executed by the control unit for the motorcycle on which the dual clutch transmission is mounted to implement similar functions to those of the control apparatus for the dual clutch transmission according to preferred embodiments of the present invention.

Transmission control unit 110 used for the description of the preferred embodiments can typically be implemented by using an integrated circuit such as an LSI. Each of the functions of transmission control unit 110 may be provided in one chip, for example. All the functions or a portion of the functions may be provided in one chip, for example. The apparatus mentioned above as an LSI may be called an IC, a system LSI, a super LSI or an ultra LSI according to the degree of integration.

The entire contents of the specification, drawings and abstract contained in Japanese Patent Application No. 2010-279432, filed on Dec. 15, 2010 are incorporated herein by reference.

The control apparatus for a dual clutch transmission and the control method for the dual clutch transmission according to preferred embodiments of the present invention have the advantage of significantly reducing or preventing a malfunction behavior of a clutch in a vehicle or the like including the dual clutch transmission when a malfunction occurs in the clutches and are used as a transmission control apparatus for a motorcycle on which a dual clutch transmission is mounted.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A control apparatus for a dual clutch transmission comprising: a first main shaft including odd-numbered transmission gears; a first clutch that transmits an engine torque to the first main shaft or blocks a transmission of the engine torque to the first main shaft; a second main shaft including even-numbered transmission gears; a second clutch that transmits the engine torque to the second main shaft or blocks the transmission of the engine torque to the second main shaft; an output shaft including driven gears arranged to mesh with the odd-numbered transmission gears and the even-numbered transmission gears, rotation from the first main shaft or the second main shaft being transmitted through the output shaft to a drive wheel; and a transmission control unit that controls the first clutch and the second clutch in a clutch interchange period to change a path of transmission of the torque to shift from a previous stage to a next stage; wherein the transmission control unit determines whether or not a clutch torque capacity of an engaging-side clutch among the first clutch and the second clutch in the next stage increases to a determination value in the clutch interchange period, and if the clutch torque capacity of the engaging-side clutch in the next stage increases to the determination value, to change the path of transmission of the torque by reducing a clutch torque capacity of a release-side clutch among the first clutch and the second clutch in the previous stage; the determination value is set to be less than a target value of the clutch torque capacity of the engaging-side clutch in the next stage; and the transmission control unit starts to reduce the clutch torque capacity of the release-side clutch in the previous stage to a target value of the clutch torque capacity of the release-side clutch when the clutch torque capacity of the engaging-side clutch in the next stage increases to the determination value so that the clutch torque capacity of the engaging-side clutch in the next stage increases to the target value of the clutch torque capacity of the engaging-side clutch in the next stage during the clutch interchange period.

2. The control apparatus for the dual clutch transmission according to claim 1, wherein in the clutch interchange period, if the clutch torque capacity of the engaging-side clutch in the next stage does not increase to the determination value, the transmission control unit ends changing of the path of transmission of the torque in a state in which a gear change is not performed, without reducing the clutch torque capacity of the release-side clutch in the previous stage.

3. The control apparatus for the dual clutch transmission according to claim 1, wherein in the clutch interchange period, the transmission control unit determines immobility in the engaging-side clutch in the next stage as sticking, and when the sticking is determined, performs a withdrawal operation that returns the clutch torque capacity of the release-side clutch in the previous stage to a capacity thereof prior to changing the path of transmission of the torque.

4. The control apparatus for the dual clutch transmission according to claim 3, wherein the transmission control unit determines the sticking when at least one of the following conditions is satisfied:
a deviation between a clutch position target value and an actual clutch position is equal to or greater than a predetermined value;
a difference in a rate at which the actual clutch position follows the clutch position target value is equal to or less than a predetermined value; and
a duration for which the rate continues for a predetermined period is a predetermined value.

5. The control apparatus for the dual clutch transmission according to claim 1, wherein in the clutch interchange period, the transmission control unit controls the first clutch and the second clutch so that a sum torque capacity of the clutch torque capacity of the engaging-side clutch in the next stage and the clutch torque capacity of the release-side clutch in the previous stage does not become equal to or less than a predetermined value that is set based on a fail-safe operation.

6. The control apparatus for the dual clutch transmission according to claim 1, wherein a time period until the clutch torque capacity of the engaging-side clutch in the next stage increases to the determination value acts as a trigger for the transmission control unit to start reducing the clutch torque capacity of the release-side clutch in the previous stage.

7. A motorcycle comprising: a control apparatus for a dual clutch transmission comprising: a first main shaft including odd-numbered transmission gears; a first clutch that transmits an engine torque to the first main shaft or blocks a transmission of the engine torque to the first main shaft; a second main shaft including even-numbered transmission gears; a second clutch that transmits the engine torque to the second main shaft or blocks the transmission of the engine torque to the second main shaft; an output shaft including driven gears arranged to mesh with the odd-numbered transmission gears and the even-numbered transmission gears, rotation from the first main shaft or the second main shaft being transmitted through the output shaft to a drive wheel; and a transmission control unit that controls the first clutch and the second clutch in a clutch interchange period to change a path of transmission of the torque to shift from a previous stage to a next stage; wherein the transmission control unit determines whether or not a clutch torque capacity of an engaging-side clutch among the first clutch and the second clutch in the next stage increases to a determination value in the clutch interchange period, and if the clutch torque capacity of the engaging-side clutch in the next stage increases to the determination value, to change the path of transmission of the torque by reducing a clutch torque capacity of a release-side clutch among the first clutch and the second clutch in the previous stage; the determination value is set to be less than a target value of the clutch torque capacity of the engaging-side clutch in the next stage; and the transmission control unit starts to reduce the clutch torque capacity of the release-side clutch in the previous stage to a target value of the clutch torque capacity of the release-side clutch when the clutch torque capacity of the engaging-side clutch in the next stage increases to the determination value so that the clutch torque capacity of the engaging-side clutch in the next stage increases to the target value of the clutch torque capacity of the engaging-side clutch in the next stage during the clutch interchange period.

8. A control method for a dual clutch transmission that includes a control apparatus programmed to control a first main shaft including odd-numbered transmission gears, a first clutch that transmits an engine torque to the first main shaft or blocks a transmission of the engine torque to the first main shaft, a second main shaft including even-numbered transmission gears, a second clutch that transmits the engine torque to the second main shaft or blocks the transmission of the engine torque to the second main shaft, and an output shaft including driven gears arranged to mesh with the odd-numbered transmission gears and the even-numbered transmission gears, rotation from the first main shaft or the second main shaft being transmitted through the output shaft to a drive wheel, the method comprising the steps of: controlling the first clutch and the second clutch in a clutch interchange period to change a path of transmission of the torque so that a shift from a previous stage to a stage is made; and determining whether or not a clutch torque capacity of an engaging-side clutch among the first clutch and the second clutch in a next stage increases to a determination value in the clutch interchange period, and if the clutch torque capacity of the engaging-side clutch in the next stage increases to the determination value, changing the path of transmission of the torque by reducing a clutch torque capacity of a release-side clutch among the first clutch and the second clutch in a previous stage, wherein the determination value is set to be less than a target value of the clutch torque capacity of the engaging-side clutch in the next stage, and in the controlling step, reducing the clutch torque capacity of the release-side clutch in the previous stage to a target value of the clutch torque capacity of the release side clutch is started when the clutch torque capacity of the engaging-side clutch in the next stage increases to the determination value so that the clutch torque capacity of the engaging-side clutch in the next stage increases to the target value of the clutch torque capacity of the engaging-side clutch in the next stage during the clutch interchange period.

* * * * *